United States Patent
Wendeborn et al.

(10) Patent No.: US 12,395,820 B2
(45) Date of Patent: Aug. 19, 2025

(54) NETWORK PROVISIONING TO MULTIPLE CORES

(71) Applicant: DISH Wireless L.L.C., Englewood, CO (US)

(72) Inventors: Jeffrey S. Wendeborn, Highlands Ranch, CO (US); Venkata Sai Pavan Nori, Parker, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 525 days.

(21) Appl. No.: 17/887,722

(22) Filed: Aug. 15, 2022

(65) Prior Publication Data

US 2023/0336954 A1    Oct. 19, 2023

Related U.S. Application Data (60) Provisional application No. 63/331,084, filed on Apr. 14, 2022.

(51) Int. Cl.
*H04W 4/50* (2018.01)
*H04W 36/06* (2009.01)
*H04W 48/18* (2009.01)

(52) U.S. Cl.
CPC .......... *H04W 4/50* (2018.02); *H04W 36/06* (2013.01); *H04W 48/18* (2013.01)

(58) Field of Classification Search
CPC ........ H04W 4/50; H04W 36/06; H04W 48/18
See application file for complete search history.

(56) References Cited

U.S. PATENT DOCUMENTS

| | | | |
|---|---|---|---|
| 7,284,041 B2 | 10/2007 | Nakatani et al. | |
| 11,683,241 B1* | 6/2023 | Wendeborn | H04L 41/50 709/227 |
| 2015/0120701 A1 | 4/2015 | Schmidt | |
| 2015/0326448 A1 | 11/2015 | Chaudhary et al. | |
| 2016/0315965 A1 | 10/2016 | Sastry et al. | |
| 2017/0078179 A1 | 3/2017 | Dunsbergen et al. | |
| 2017/0093628 A1 | 3/2017 | Lin et al. | |
| 2018/0324251 A1 | 11/2018 | Padmanabh et al. | |
| 2019/0356622 A1 | 11/2019 | Song et al. | |

(Continued)

FOREIGN PATENT DOCUMENTS

| | | |
|---|---|---|
| EP | 2326060 A1 | 5/2011 |
| WO | 2021/181408 A1 | 9/2021 |

OTHER PUBLICATIONS

International Search Report and Written Opinion for International Application No. PCT/US2023/018356, dated Jul. 7, 2023, 15 pages.

*Primary Examiner* — Elton Williams
(74) *Attorney, Agent, or Firm* — Seed Intellectual Property Law Property LLP (57) ABSTRACT

Systems and method are directed towards provisioning multiple cloud cores for new wireless services. An order for the new wireless service for a customer device is received and a customer identifier associated with the order is determined. A first service and a second service are identified for the order based on the customer identifier. The first service is different from the second service. A first cloud core is provisioned for the first service. And a second cloud core is provisioned for the second service. The second cloud core executes separately from the first cloud core.

20 Claims, 4 Drawing Sheets

(56) References Cited

U.S. PATENT DOCUMENTS

| | | |
|---|---|---|
| 2020/0105259 A1 | 4/2020 | Lin et al. |
| 2020/0169533 A1* | 5/2020 | Westberg ............ H04L 63/0236 |
| 2020/0244551 A1* | 7/2020 | Tidemann ........... H04L 67/1097 |
| 2020/0374142 A1 | 11/2020 | Tandon |
| 2021/0051070 A1 | 2/2021 | Akman et al. |
| 2022/0038554 A1* | 2/2022 | Merwaday .............. H04L 45/64 |
| 2022/0201473 A1 | 6/2022 | Alpert et al. |

* cited by examiner

NETWORK PROVISIONING TO MULTIPLE CORES

BACKGROUND

Technical Field

The present disclosure relates generally to network provisioning and, more particularly, to dynamically provisioning networking features to different cloud cores.

Description of the Related Art

Smart phones are being used more and more by more and more people. As the use of smart phones has increased, so too has the desire for more reliable, fast, and continuous transmission of content. In an effort to improve the content transmission, networks continue to improve with faster speeds and increased bandwidth. The advent and implementation of 5G technology has resulted in faster speeds and increased bandwidth. The design and deployment of such a wireless network relies on a great number of hardware and computing resources. Unfortunately, different types of computing tasks generally utilize different computing resources, which can increase the amount of overhead needed to support such computing tasks. It is with respect to these and other considerations that the embodiments described herein have been made.

BRIEF SUMMARY

Briefly described, embodiments are directed toward systems and methods of provisioning multiple cloud cores for new wireless services. An order for new wireless service for a customer is received. The customer of the order is determined, and one or more networking services, such as a first service and a second service, are selected for that order based on the identification of the customer. A first cloud core is then provisioned for the first service, and a different second cloud core is provisioned for the second service. When a second order is received for new wireless service for a second customer, networking services for the second order are identified and additional cloud cores are provisioned for those services. In this way, separate cloud cores are provisioned for separate networking services.

Identifying the first service and the second service associated with the order may include selecting a first application programming interface end point that is associated with the first service and selecting a second application programming interface end point that is associated with the second service. The first and second application programming interface end points can then be used to provision the cloud cores. For example, the first application programming interface end point can be employed to call the first cloud core with the order for the first service, and the second application programming interface end point can be employed to call the second cloud core with the order for the second service. In some embodiments, a plurality of application programming interface end points can be grouped into a region of end points. Different cloud cores can then be assigned to each of the plurality of application programming interface end points and one or more customers can be assigned to the group of end points. In this way, the region or group of end points is selected from multiple regions based on the customer, and the first and second application programming interface end points are selected from the group of end points.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
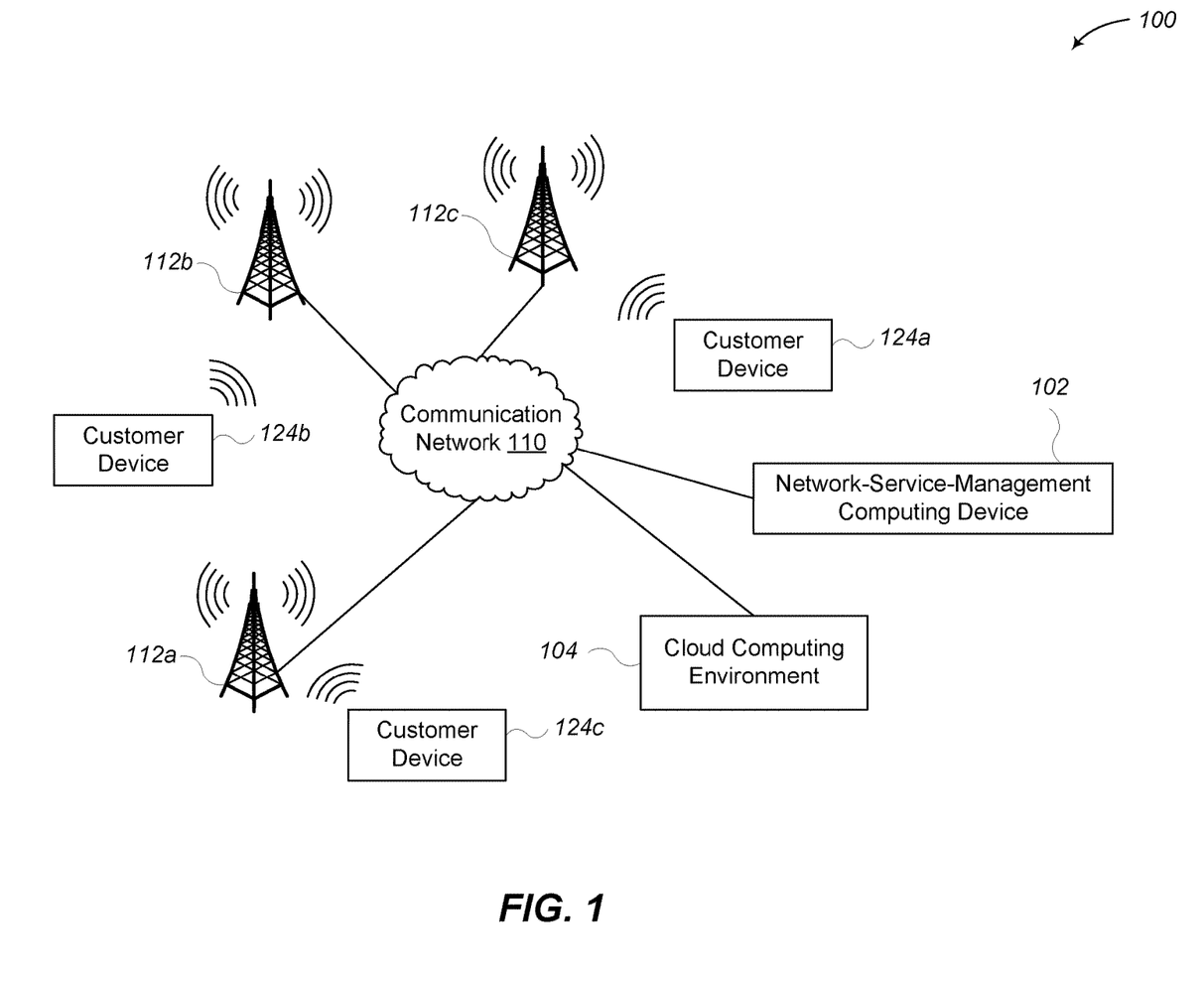
FIG. 1 illustrates a context diagram of an environment for dynamically provisioning multiple cloud cores for new wireless network service in accordance with embodiments described herein.

FIG. 1 illustrates a context diagram of an environment 100 for dynamically provisioning multiple cloud cores for new wireless network service in accordance with embodiments described herein. Environment 100 includes a plurality of cells 112a-112c, a plurality of customer or user devices 124a-124b, a network-service-management computing device 102, a cloud computing environment 104, and a communication network 110.

The customer devices 124a-124c are computing devices that receive and transmit cellular communication messages with the cells 112a-112c. Examples of customer devices 124a-124c may include, but are not limited to, mobile devices, smartphones, tablets, cellular-enabled laptop computers, or other computing devices that can communication with a cellular network.

The cells 112a-112c are cellular towers that together provide the hardware infrastructure of a cellular communications network, e.g., a 5G cellular communications network. The cells 112a-112c may include or be in communication with base stations, radio back haul equipment, antennas, or other devices, which are not illustrated for ease of discussion. In various embodiments, the cells 112a-112c may communicate with each other via communication network 110. Communication network 110 includes one or more wired or wireless networks, which may include a series of smaller or private connected networks that carry information between the cells 112a-112c.

The cloud computing environment 104 is a collection of computing resources that can be utilized to form separate virtual computing environments for use by computing devices. These virtual computing environments can be provisioned as cloud-computing cores to perform functionality associated with a particular networking service.

The network-service-management computing device 102 is configured to manage orders for new wireless services for customer devices 124a-124b, such as when a new customer device 124 requests access to join the communication network or is setup to join the communication network. The network-service-management computing device 102 determines which networking services are to be setup and initialized for that new customer device 124 based on the order received for that customer device 124. The network-service-management computing device 102 communicates with the cloud computing environment 104 to provision separate cloud-computing cores for the separate networking services for that customer device 124. As described herein, the networking services may be specific network functions (e.g., management of data usage for the customer device, management of voice usage for the customer device, management of messaging usage for the customer device, etc.), test environments (e.g., device-specific testing, load balancing testing, etc.), or other functionality to facilitate and manage the communication network.

Figure 2:
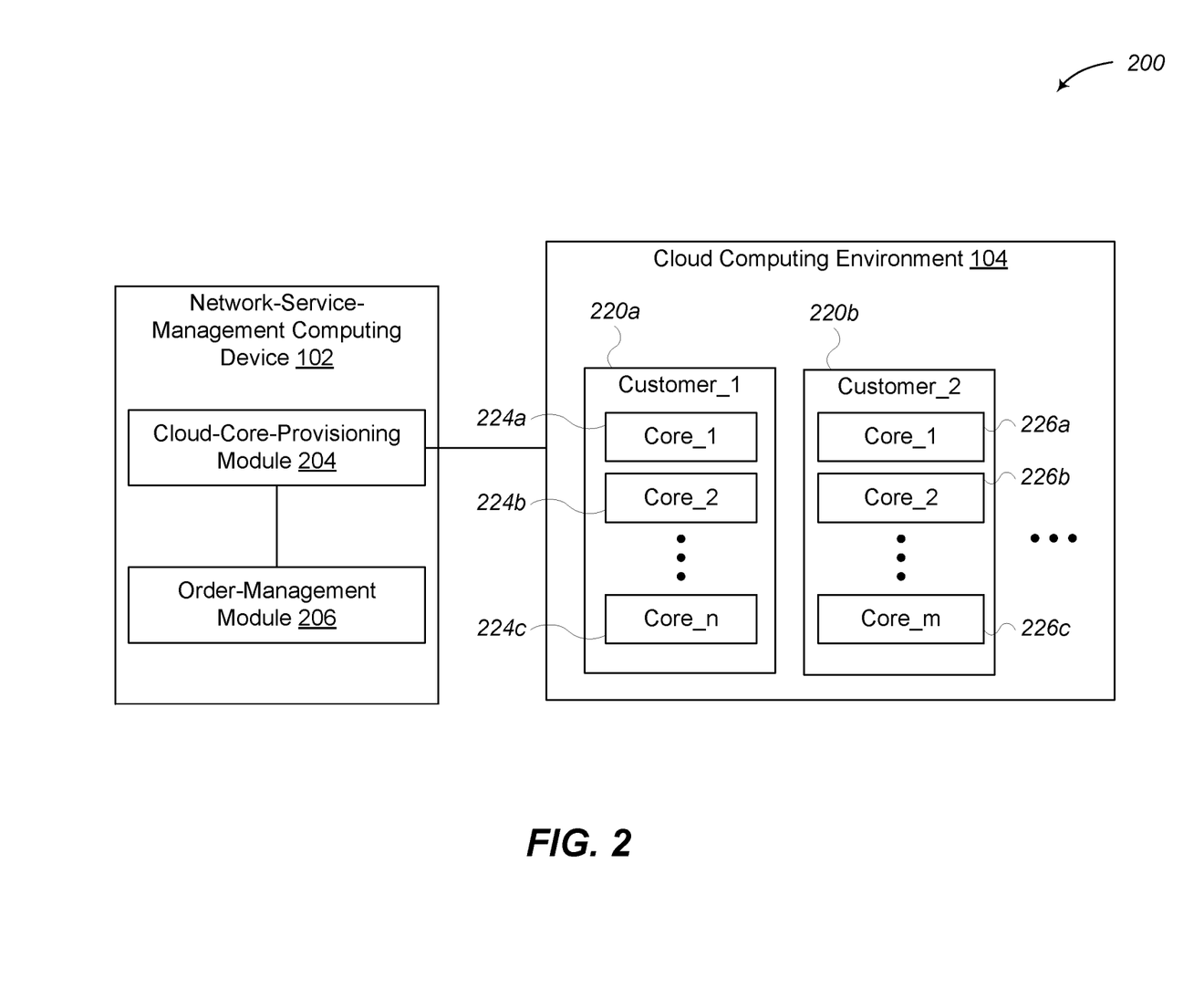
FIG. 2 is a context diagram of a non-limiting embodiment of systems that provide functionality to dynamically provision multiple cloud cores in accordance with embodiments described herein.

FIG. 2 is a context diagram of a non-limiting embodiment of systems that provide functionality to dynamically provision multiple cloud cores in accordance with embodiments described herein. Example 200 includes network-service-management computing device 102 and cloud computing environment 104, similar to the network-service-management computing device 102 and the cloud computing environment 104 shown in FIG. 1.

The network-service-management computing device 102 is configured to manage new wireless service orders. The network-service-management computing device 102 may include a cloud-core-provisioning module 204 and an order-management module 206. The order-management module 206 is configured to receive orders for new wireless services. These orders may be received from a customer device that is being added to the wireless communication network, or they may be generated by the order-management module 206 on behalf of a customer device. The order-management module 206 determines which networking services are to be used or initialized for each order. The order-management module 206 communicates those networking services to the cloud-core-provisioning module 204. The cloud-core-provisioning module 204 utilizes API end points that are associated with the networking services to provision cloud-computing cores in the cloud computing environment 104.

Although the cloud-core-provisioning module 204 and the order-management module 206 are illustrated as separate modules, embodiments are not so limited. Rather, functionality of the cloud-core-provisioning module 204 and the order-management module 206 may be performed by a single module or a plurality of modules.

The cloud computing environment 104 provisions and maintains cloud-computing cores for the different networking services being established for different customers. In this illustrative example, the cloud computing environment 104 has provisioned cores 224a-224c for customer 220a and has provisioned cores 226a-226c for customer 220b. Each separate core is provisioned to perform the functionality of a different networking service.

Figure 3:
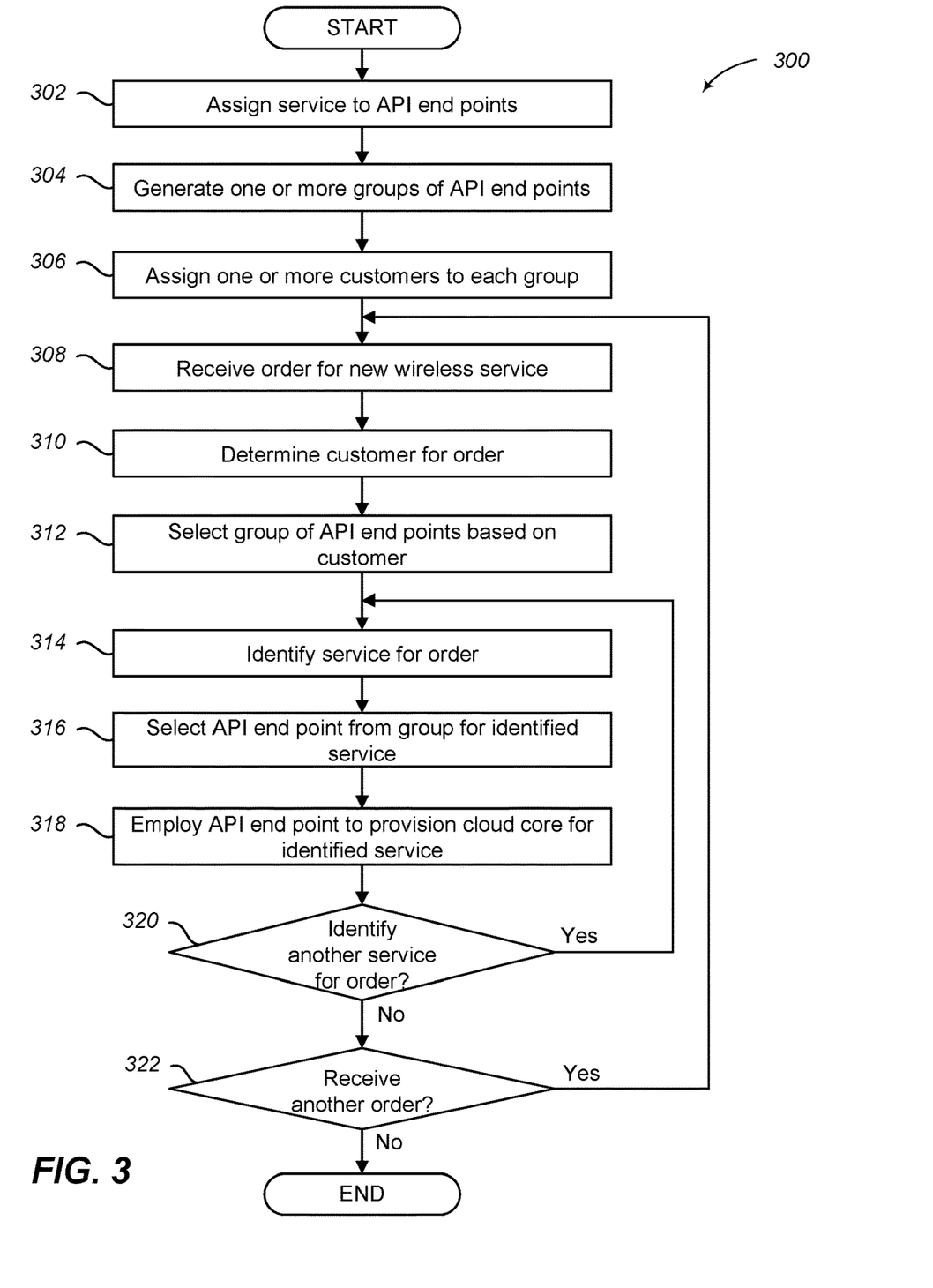
FIG. 3 illustrates a logical flow diagram showing one embodiment of a process for dynamically provisioning multiple cloud cores for new wireless network service in accordance with embodiments described herein.

FIG. 3 illustrates a logical flow diagram showing one embodiment of a process 300 for dynamically provisioning multiple cloud cores for new wireless network service in accordance with embodiments described herein. In at least one of various embodiments, process 300 may be implemented by or executed via circuitry or on one or more computing devices, such as network-service-management computing device 102 in FIG. 1.

Process 300 begins, after a start block, at block 302 where a plurality of networking services are assigned to a plurality of API end points. In various embodiments, each separate networking service is assigned to one API end point. In at least one embodiment, a networking service may be assigned to multiple API end points. In some embodiments, a cloud core associated with the networking service is also assigned to the same API end point as the networking service. The networking services may include network functions, device test environments, network capacity test environments, network load test environments, or other computing environments associated with a wireless network.

Process 300 proceeds to block 304, where one or more groups of API end points are generated. These groups may be referred to a regions of networking services. Each group may include one or more API end points. Accordingly, one or more networking services are associated with each group. In some embodiments, a same API end point may be in two or more different groups. In other embodiments, each group includes a unique set of API end points.

Process 300 continues at block 306, where one or more customers are assigned to each group. In some embodiments, this assignment may be for specific customers, such as a list of customer identifiers. In other embodiments, a category or characteristic of customers may be used to assign customers to a group of API end points without assigning specific customers to the group.

Process 300 proceeds next to block 308, where an order for new wireless service is received for a customer device. In some embodiments, the order may be to establish networking services for a new customer. In other embodiments, the order may also be to change or modify networking services for an existing customer. For example, the order may be to change from a data networking service to a messaging networking service for an existing customer. In various embodiments, the order identifies the customer associated with the device and the new wireless service. The order may also indicate which networking services are to be employed for that customer, such as data, voice, messaging, device management, subscription, roaming, etc.

Process 300 continues next at block 310, where a customer is determined for the order. As indicated above, the order itself may include a customer identifier that is used to determine the customer. In other embodiments, a database that maps customer devices to customer identifiers or customer identification may be accessed using the customer device information in the order to determine the customer identifier or customer identification. In yet other embodiments, the customer may be defined using one or more characteristics or attributes of the customer, such as geographic area where the customer resides, types of networking services being requested, type of network request (e.g., private or public network access, or sub-network access), type of customer devices requesting access, or other demographic or network information.

Process 300 proceeds to block 312, where a region or group of API end points is selected based on the customer. In some embodiments, the specific customer identifier may be used to select the group of API end points. In other embodiments, characteristics of the customer may be used to select the group. For example, different groups may be associated with different metropolitan areas, and the group associated with the metropolitan area of the customer may be selected. This example is not to be limiting and other customer characteristics may be used to select a group of API end points from the plurality of groups of API end points.

Process 300 continues at block 314, where a network service is identified for the order. In some embodiments, the order may itself identify the networking service. The networking service may be a specific network function, such as data management, voice management, messaging management, etc. In other embodiments, the networking service may be associated with networking or device testing. For example, if the customer device is Model_A for Manufacturer_B, then the networking service may be testing various aspects of how that device operates in the network.

Process 300 proceeds next to block 316, where an API end point associated with the identified service is selected. In some embodiments, a configuration file may be used to indicate which networking services are associated with or map to which API end points.

Process 300 continues next at block 318, where the selected API end point is employed to provision a cloud-computing core for the identified service. In various embodiments, the selected API end point is used to call the cloud-computing infrastructure and request that a cloud-computing core be established to perform the functionality of the associated identified networking service. In some embodiments, a configuration file may be used to map the API end points to the provisioning of cloud-computing cores to perform the networking service functionality.

After block 318, process 300 proceeds to decision block 320, where a determination is made whether another service is identified for the order. In various embodiments, the order may include a plurality of different networking services. In other embodiments, the group of API end points may include a plurality of API end points that are associated with a plurality of networking services. If another networking service is to be selected or identified for the order, then process 300 loops to block 314, where another networking service is identified and a corresponding API end point is selected and employed to provision a cloud-computing core for that networking service for the order. Accordingly, a separate cloud-computing core is provisioned for each separate networking service for the order. If another networking service is not selected or identified for the order, then process 300 flows to decision block 322.

At decision block 322, a determination is made whether another order is received. If another order is received, process 300 loops to block 308 to process the other order and provision separate cloud-computing cores for each networking service associated with that other order; otherwise, process 300 terminates or returns to a calling process to perform other actions.

Figure 4:
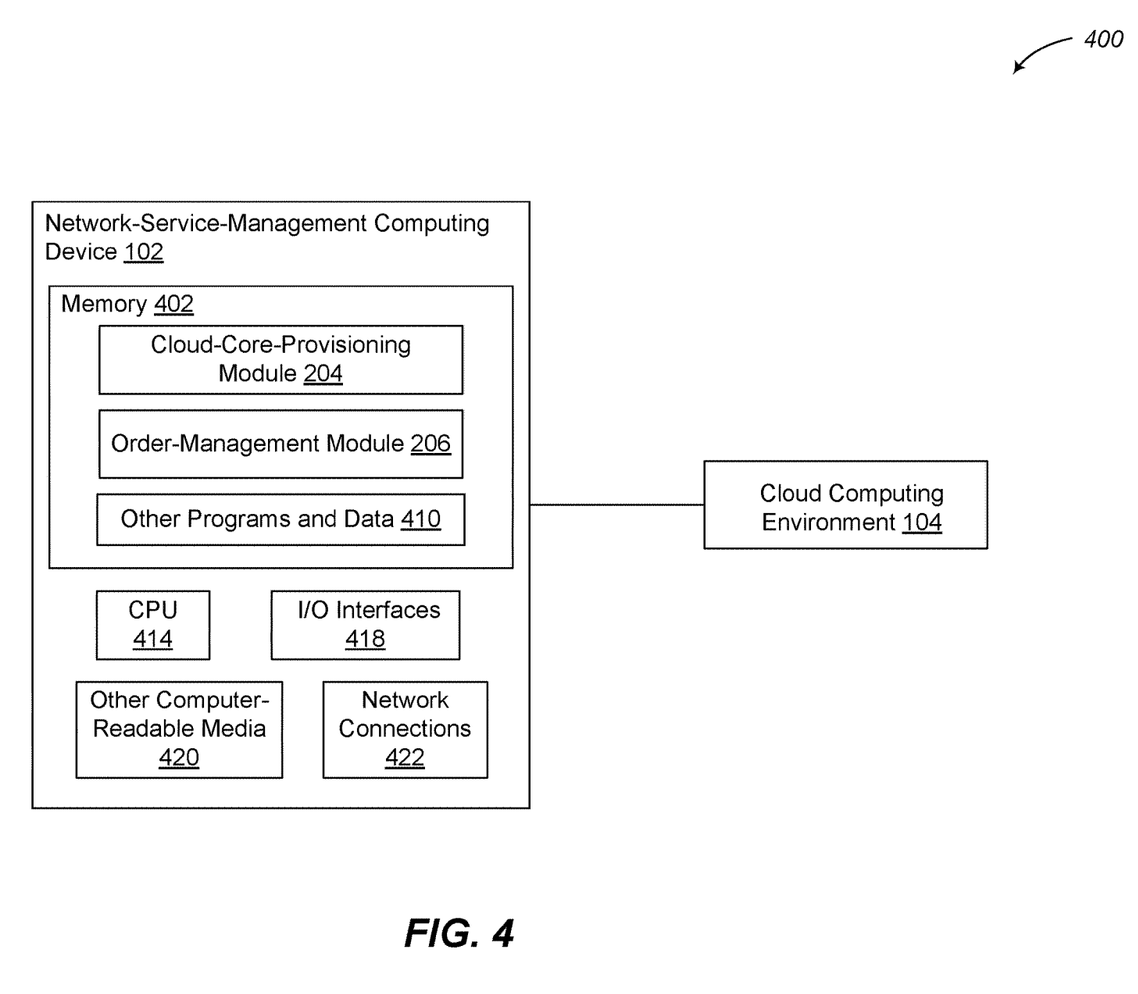
FIG. 4 shows a system diagram that describe various implementations of computing systems for implementing embodiments described herein.

FIG. 4 shows a system diagram that describe various implementations of computing systems for implementing embodiments described herein. System 400 includes a network-service-management computing device 102 and a cloud computing environment 104. As described herein, the cloud computing environment 104 includes computing components and resources that can be utilizes as cloud-computing cores in a virtual computing environment The network-service-management computing device 102 initializes the provisioning of multiple cloud-computing cores for separate networking services for customer devices, as described herein. One or more special-purpose computing systems may be used to implement network-service-management computing device 102. Accordingly, various embodiments described herein may be implemented in software, hardware, firmware, or in some combination thereof. The network-service-management computing device 102 may include memory 402, one or more central processing units (CPUs) 414, I/O interfaces 418, other computer-readable media 420, and network connections 422.

Memory 402 may include one or more various types of non-volatile and/or volatile storage technologies. Examples of memory 402 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 402 may be utilized to store information, including computer-readable instructions that are utilized by CPU 414 to perform actions, including embodiments described herein.

Memory 402 may have stored thereon cloud-core-provisioning module 204 and order-management module 206. The cloud-core-provisioning module 204 is configured to utilize API end points to call on the cloud computing environment 104 to provision separate cloud-computing cores for separate networking services and to manage the use of those cores, as described herein. The order-management module 206 is configured to manage the receipt of orders for new wireless services and to coordinate the provisioning of the cloud-computing cores for those services with the cloud-core-provisioning module 204, as described herein. Memory 402 may also store other programs and data 410.

Network connections 422 are configured to communicate with other computing devices, such as the cloud computing environment 102, to facilitate the provisioning of cloud-computing cores in the cloud computing environment 104. In various embodiments, the network connections 422 include transmitters and receivers (not illustrated) to send and receive data as described herein. I/O interfaces 418 may include a video interfaces, other data input or output interfaces, or the like. Other computer-readable media 420 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   receiving an order for new wireless service for a customer device to access a cellular communication network;
   determining a customer identifier associated with the order;
   identifying a first service of the cellular communication network and a second service of the cellular communication network for the order based on the customer identifier, wherein the first service is different from the second service;
   provisioning a first cloud core to provide the first service for the customer device while accessing the cellular communication network; and
   provisioning a second cloud core to provide the second service for the customer device while accessing the cellular communication network, wherein the second cloud core executes separately from the first cloud core.

2. The method of claim 1, wherein identifying the first service of the cellular communication network and the second service of the cellular communication network for the order comprises:
   selecting a first application programming interface end point associated with the first service of the cellular communication network; and
   selecting a second application programming interface end point associated with the second service of the cellular communication network.

3. The method of claim 2, wherein provisioning the first cloud core and provisioning the second cloud core comprises:
   employing the first application programming interface end point to call the first cloud core with the order for the first service of the cellular communication network; and
   employing the second application programming interface end point to call the second cloud core with the order for the second service of the cellular communication network.

4. The method of claim 1, wherein provisioning the first cloud core and provisioning the second cloud core comprises:
   employing a first application programming interface end point to provision the first cloud core for the first service of the cellular communication network for the order; and
   employing a second application programming interface end point to provision the second cloud core for the second service of the cellular communication network for the order.

5. The method of claim 1, further comprising:
   grouping a plurality of application programming interface end points into a region of end points;
   assigning a different cloud core to each of the plurality of application programming interface end points; and
   assigning one or more customers accessing the cellular communication network to the group of end points.

6. The method of claim 5, wherein provisioning the first cloud core and provisioning the second cloud core comprises:
   selecting a first application programming interface end point from the group of end points for the first service of the cellular communication network for the order;
   selecting a second application programming interface end point from the group of end points for the second service of the cellular communication network for the order;
   employing the first application programming interface end point to provision the first cloud core; and
   employing the second application programming interface end point to provision the second cloud core.

7. The method of claim 1, further comprising:
   receiving a second order for new wireless service for a second customer device to access the cellular communication network;
   determining a second customer identifier associated with the second order;
   identifying the first service of the cellular communication network and a third service of the cellular communication network for the second order based on the second customer identifier, wherein the first service is different from the third service;
   provisioning a third cloud core to provide the first service for the second customer device while accessing the cellular communication network; and
   provisioning a fourth cloud core to provide the third service for the second customer device while accessing the cellular communication network, wherein the third cloud core executes separately from the fourth cloud core.

8. A system comprising:
   a memory that stores computer instructions; and
   at least one processor that executes the computer instructions to:
   receive an order for new wireless service for a customer device to access a cellular communication network;
   determine a customer identifier associated with the order;
   identify a first service of the cellular communication network and a second service of the cellular communication network for the order based on the customer identifier, wherein the first service is different from the second service;
   provision a first cloud core for the first service of the cellular communication network; and
   provision a second cloud core for the second service of the cellular communication network, wherein the second cloud core executes separately from the first cloud core.

9. The system of claim 8, wherein at least one processor identifies the first service of the cellular communication network and the second service of the cellular communication network for the order by further executing the computer instructions to:
   select a first application programming interface end point associated with the first service of the cellular communication network; and
   select a second application programming interface end point associated with the second service of the cellular communication network.

10. The system of claim 9, wherein at least one processor provisions the first cloud core and provisioning the second cloud core by further executing the computer instructions to:
employ the first application programming interface end point to call the first cloud core with the order for the first service of the cellular communication network; and
employ the second application programming interface end point to call the second cloud core with the order for the second service of the cellular communication network.

11. The system of claim 8, wherein at least one processor provisions the first cloud core and provisioning the second cloud core by further executing the computer instructions to:
employ a first application programming interface end point to provision the first cloud core for the first service of the cellular communication network for the order; and
employ a second application programming interface end point to provision the second cloud core for the second service of the cellular communication network for the order.

12. The system of claim 8, wherein the at least one processor further executes the computer instructions to:
group a plurality of application programming interface end points into a region of end points;
assign a different cloud core to each of the plurality of application programming interface end points; and
assign one or more customers accessing cellular communication network to the group of end points.

13. The system of claim 12, wherein at least one processor provisions the first cloud core and provisioning the second cloud core by further executing the computer instructions to:
select a first application programming interface end point from the group of end points for the first service of the cellular communication network for the order;
select a second application programming interface end point from the group of end points for the second service of the cellular communication network for the order;
employ the first application programming interface end point to provision the first cloud core; and
employ the second application programming interface end point to provision the second cloud core.

14. The system of claim 8, wherein the at least one processor further executes the computer instructions to:
receive a second order for new wireless service for a second customer device to access the cellular communication network;
determine a second customer identifier associated with the second order;
identify the first service of the cellular communication network and a third service of the cellular communication network for the second order based on the second customer identifier, wherein the first service is different from the third service;
provision a third cloud core for the first service of the cellular communication network for the second order; and
provision a fourth cloud core for the third service of the cellular communication network for the second order, wherein the third cloud core executes separately from the fourth cloud core.

15. A non-transitory computer-readable medium having contents that, when executed by at least one processor, cause the at least one processor to perform a method, the method comprising:
receiving an order for new wireless service for a customer device to access a cellular communication network;
determining a customer identifier associated with the order;
selecting a voice networking service of the cellular communication network and a data networking service of the cellular communication network for the order based on the customer identifier;
provisioning a first cloud core of the cellular communication network to provide the customer device access to the voice networking service of the cellular communication network; and
provisioning a second cloud core for of the cellular communication network to provide the customer device access to the data networking service of the cellular communication network, wherein the second cloud core executes separately from the first cloud core.

16. The non-transitory computer-readable medium of claim 15, wherein selecting the voice networking service of the cellular communication network and the data networking service of the cellular communication network for the order comprises:
selecting a first application programming interface end point associated with the voice networking service of the cellular communication network; and
selecting a second application programming interface end point associated with the data networking service of the cellular communication network.

17. The non-transitory computer-readable medium of claim 16, wherein provisioning the first cloud core and provisioning the second cloud core comprises:
employing the first application programming interface end point to call the first cloud core with the order for the voice networking service of the cellular communication network; and
employing the second application programming interface end point to call the second cloud core with the order for the data networking service of the cellular communication network.

18. The non-transitory computer-readable medium of claim 15, the method further comprising:
grouping a plurality of application programming interface end points into a region of end points;
assigning a different cloud core to each of the plurality of application programming interface end points; and
assigning one or more customers accessing the cellular communication network to the group of end points.

19. The non-transitory computer-readable medium of claim 18, wherein provisioning the first cloud core and provisioning the second cloud core comprises:
selecting a first application programming interface end point from the group of end points for the voice networking service of the cellular communication network for the order;
selecting a second application programming interface end point from the group of end points for the data networking service of the cellular communication network for the order;
employing the first application programming interface end point to provision the first cloud core to provide the voice networking service of the cellular communication network to the customer device; and
employing the second application programming interface end point to provision the second cloud core to provide the data networking service of the cellular communication network to the customer device.

20. The non-transitory computer-readable medium of claim 15, the method further comprising:
- receiving a second order for new wireless service for a second customer device to access the cellular communication network;
- determining a second customer identifier associated with the second order;
- selecting the voice networking service of the cellular communication network and a message networking service the cellular communication network for the second order based on the second customer identifier;
- provisioning a third cloud core for of the cellular communication network to provide the second customer device access to the voice networking service of the cellular communication network; and
- provisioning a fourth cloud core of the cellular communication network to provide the second customer device access to the message networking service of the cellular communication network, wherein the third cloud core executes separately from the fourth cloud core.

* * * * *